UNITED STATES PATENT OFFICE.

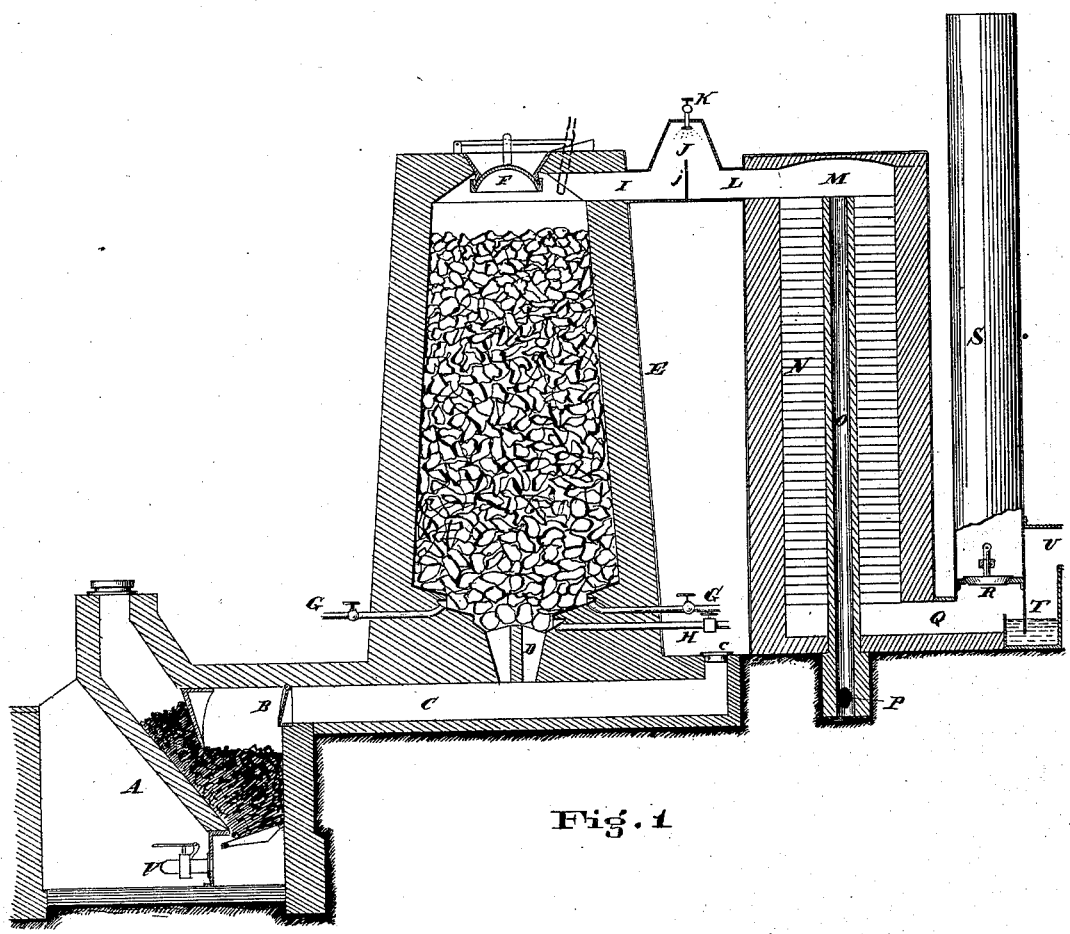

RUDOLPH M. HUNTER, OF PHILADELPHIA, PENNSYLVANIA.

IMPROVEMENT IN PROCESSES AND APPARATUS FOR MANUFACTURING ILLUMINATING-GAS.

Specification forming part of Letters Patent No. 216,519, dated June 17, 1879; application filed April 5, 1879.

*To all whom it may concern:*

Be it known that I, RUDOLPH M. HUNTER, of Philadelphia, in the county of Philadelphia and State of Pennsylvania, have invented a new and useful Process and Apparatus for Manufacturing Illuminating-Gas, and of which the following is a description, reference being had to the accompanying drawings.

My invention relates to those processes in which an illuminating-gas is produced from water, and known as "water-gas;" and consists in decomposing water when in the vaporized state into its elements, hydrogen and oxygen, and in separating the hydrogen from the oxygen.

To obtain the hydrogen, which constitutes my water-gas, I first produce a gas which is used to deoxidize suitable oxides in another retort or chamber, and when the reduced oxides and steam come together the hydrogen is set free, since the oxygen goes to the partially-reduced oxides. This has been done to a certain extent in the laboratory; but so far as I am aware it has never been done with an object of using (on a large scale) the free hydrogen for illuminating purposes.

It is a well-known fact to every metallurgist that from six to nine per cent. of hydrogen in the free state is found in the escaping gases from the downcomer of a blast-furnace when said furnace is running on a low temperature of hot-blast, and when the oxides of iron are being smelted; but as to whether the iron or carbon combines with the oxygen of the vapor in the blast and moisture in the burden and sets the hydrogen free is not positively known, but the hydrogen is generated from water in the presence of oxides; hence the invention of the actual generation of hydrogen by the foregoing and subsequent means is not new; but the generation of hydrogen and its combination or mixture with volatilized hydrocarbons, and the mixture made a fixed gas by heat, and the apparatus for doing it, is new and valuable, so far as I am aware, and opens new operations.

I am also aware that perfectly pure hydrogen gas has been produced by the action of carbonic oxide on oxide of iron reduced to the state of sponge and the subsequent decomposition of steam, substantially, or nearly so, as herein explained; but my invention consists in the combination of the process for the production of hydrogen with the process of carbureting said hydrogen, whereby an illuminating-gas is produced.

The process for the generation of hydrogen is old, and is stated fully in the patent (French) to Margurite.

In generating hydrogen I obtain it free from all injurious gases, as carbonic oxide and carbonic acid, which, for illuminating purposes, I consider absolutely necessary.

In other processes for making water-gas—such as those of Lowe and Strong—there is from twenty to forty per cent. of carbonic oxide in the gas, and which renders it injurious to a considerable extent, and objectionable, since it dilutes the hydrogen that they obtain, increases the specific gravity of the produced gas, and, as the carbonic oxide gives no illumination during combustion, it is foreign as well as injurious.

In producing my gas I do not obtain either carbonic oxide or carbonic acid or any other foreign substance or gas, which is a great advantage over other processes, and after it is carbureted by liquid hydrocarbons in the usual manner it becomes far more luminous, since it has a greater candle-power, owing to its purity.

Again, with other illuminating water-gas only about seventy per cent. is of any value as a light-giving medium, while with mine all is of value as such a medium.

The object of my invention is to produce an illuminating-gas which has a high candle-power and medium specific gravity at a low cost, and at the same time be free from carbonic oxide.

Figure 1 is a sectional elevation of a suitable furnace for the generation of my water-gas. Fig. 2 is an elevation of an ordinary gas-burner and a part of gas-main.

A is a gas-producer, the object of which is to generate carbonic oxide. The producer may be of any suitable design. It is supplied with an air-valve, V, for blast. Leading from the producer A is a culvert, C, supplied with a gas-tight valve, B, and at the other end a manhole, c. Situated over the culvert C is a chamber, E, nearly filled with any cheap oxide; but an oxide of iron is preferred. This chamber E is connected to the culvert C by openings D. At the base of chamber E steam-pipes G G and an air-blast pipe, H, enter. At the top of the chamber E is a gas-tight valve, F, for the purpose of filling the chamber. The top of the chamber E is connected with a reheater, N, by flue I J L. At the top of part J of flue is a fluid-hydrocarbon nozzle, K, and immediately under it is a partition, j, which forces the hydrogen to pass up and around the nozzle K. The hydrocarbon-pipe may be directly connected with the oxide-chamber E for admitting hydrocarbons into said chamber over the oxides, as indicated by dotted lines.

M is the combustion-chamber of the reheater N. Blast to reheater comes in at P and ascends through column O, in which it is converted into hot-blast. The bottom of reheater N is connected to the chimney S by flue Q. In the chimney S is a gas-tight valve, R. To the opposite side of stack is a washer or hydraulic main, T, and from it is a flue, U, to the gas holder or mains.

To obtain my gas I proceed as follows: The steam from pipes G G and fluid hydrocarbon from pipe K being shut off, and the valves R and B being open and blast from V being on, the carbonic oxide generated in A from brown coal, peat, slack, sawdust, &c., passes through culvert C and openings D into the chamber E, and deoxidizes the surface of the oxides in said chamber, and the escaping gases, which are mainly carbonic acid, pass into combustion-chamber M, where the remaining carbonic oxide is burned to carbonic acid by the incoming heated blast from O, and the products of combustion pass down through the open firebrick filling of the reheater N, and through valve R into the stack S. If there should not be sufficient heat in the chamber E blast can be admitted by the pipe H; but this is not desirable, since the oxides should furnish sufficient oxygen to burn most of the carbonic oxide to carbonic acid.

Now, reverse all the valves and close pipe H. The steam is admitted into chamber E, when it is immediately decomposed, and the oxygen of the steam brings the reduced oxides back to their original composition, while the hydrogen is set free. As the hydrogen passes through the part J of the flue I J L it meets volatilized fluid hydrocarbons from nozzle K, and mixes with them to form illuminating-gas. The mixture then passes into the reheater N, and is then converted into a fixed gas, which, as the valve R is closed, passes through the washer into the holder. These two operations go on alternately as long as gas is being generated. No purifying apparatus is necessary with my process.

Should I only wish to use the gas for heating or metallurgical purposes, I connect the flues I and Q, and hence do away with the reheater.

I can readily dilute my hydrogen with carbonic oxide if I wish by conveying some oxide from the producer A and mixing it with the generated hydrogen.

The chamber E may be placed directly over the producer, and thus make one stack of the two.

I do not consider that it would alter my invention by putting a valve in I and another valved flue from the bottom of the chamber E, and removing the steam-pipes G G to the top, and forcing the hydrogen to descend through the reduced ore, and withdrawing it at the bottom.

I claim—

1. The process of generating illuminating-gas, which consists in alternately deoxidizing oxides of iron by passing carbonic-oxide gas through them, and decomposing steam by passing it through the reduced oxides, setting free the hydrogen, and mixing with such hydrogen hydrocarbon vapors, and finally combining and fixing the mixture by heat, substantially as specified.

2. The combination of the producer A, supplied with blast-pipe V, passage C D, supplied with a valve, B, oxide-chamber E, supplied with steam-pipes G G, and air-blast pipe H, an outlet-flue, a fluid hydrocarbon supply-pipe, reheater N, flue Q, valve R, and washer T, substantially as and for the purpose specified.

3. The reheater N, having a combustion-chamber, M, at the top, and a central flue, O, for the supply of blast, substantially as and for the purpose specified.

4. The combination of the producer A, oxide-chamber E, steam-pipes G G, reheater N, exit-pipe, and valve R, substantially as and for the purpose specified.

5. The oxide-chamber E and a reheater, N, in combination with flues I and L, chamber J, and fluid-hydrocarbon nozzle K, substantially as and for the purpose specified.

6. The combination of a gas-producer, A, flue C D, supplied with a valve, B, oxide-chamber E, steam-pipes G G, flues I and L, nozzle K, reheater N, valve R, washer T, and gas-main U, substantially as and for the purpose specified.

In testimony of which invention I hereunto set my hand.

R. M. HUNTER.

Witnesses:
H. M. HOFFMAN,
CHAS. F. VAN HORN.